United States Patent
Künzel et al.

[11] Patent Number: 5,868,109
[45] Date of Patent: Feb. 9, 1999

[54] HOUSING COVER WITH COMPENSATING ELEMENTS

[75] Inventors: Heinz-Thomas Künzel; Bernd-Martin Schuh, both of Bretten, Germany

[73] Assignee: Glöckler-Dichtsysteme Günter Hemmrich GmbH, Bretten, Germany

[21] Appl. No.: 871,723

[22] Filed: Jun. 9, 1997

[30] Foreign Application Priority Data

Oct. 16, 1996 [DE] Germany .................. 196 42 604.9

[51] Int. Cl.⁶ .................................................. F01M 9/10
[52] U.S. Cl. ........................... 123/90.38; 123/90.37; 123/195 C; 184/6.5; 277/235 B
[58] Field of Search .................. 123/90.33, 90.37, 123/90.38, 195 C, 198 E; 184/6.5, 6.9; 277/235 B

[56] References Cited

U.S. PATENT DOCUMENTS 5,375,569  12/1994  Santella ......................... 123/90.38
5,513,603  5/1996  Ang et al. ...................... 123/90.38

*Primary Examiner*—Weilun Lo
*Attorney, Agent, or Firm*—Klaus J. Bach

[57] ABSTRACT

In a housing cover, particularly a valve cover for an internal combustion engine, having a seal surface extending around its circumference at one side thereof with a seal structure molded onto the seal surface, deformable projections are formed on the side opposite the seal surface for engaging the housing cover by a tool when the seal is molded onto the seal surface.

5 Claims, 4 Drawing Sheets

HOUSING COVER WITH COMPENSATING ELEMENTS

BACKGROUND OF THE INVENTION

The invention relates to a housing cover, particularly for the valve operating mechanism of an internal combustion engine, which includes, at one side thereof, a gasket structure molded thereon.

In many industrial areas, machines are used which employ oil or coolant in a surge-like fashion. In an internal combustion engine for example, the valve shafts are disposed in an oil spray. Because the oilsprayed or splurged around the rocker arms and valve shafts, it is necessary to seal the area including the oil or coolant against the ambient area. In order to make those areas accessible, they are generally provided with a removable cover. To prevent the escape of liquid, there is a gasket disposed between the housing and the housing cover. To facilitate assembly, the gasket is generally pre-mounted to the housing cover.

It is known to mold the gasket onto the housing cover. This is generally done by placing onto the side of the housing cover on which the gasket is to be disposed a tool which has cavities in the form of the gasket and injecting into these cavities a liquid seal material under high pressure. In order to retain the seal material in the cavities and prevent it from being squeezed out, the edges of the tool must be seated on the housing cover in a seal-tight manner. To achieve an appropriate seal the tool usually has, at the contact areas with the housing cover, wedge-like projections by which the housing cover is engaged and which, as a result, provide for a good seal structure.

The wedge-like projections do not only provide for the seal tightness, but they also accommodate manufacturing tolerances of the housing cover. Since it is not certain that the housing cover has always the same thickness in the area where the seal is to be applied, but the tool always comes down to the same working position the housing cover or the tool may be damaged if there is no tolerance adjustment. The wedge-like raised areas of the tool are therefore generally so dimensioned that they penetrate to a greater or smaller degree into the surface of the housing cover whereby they can accommodate relatively large manufacturing tolerances. To accommodate the manufacturing tolerances, the wedge-like projection however penetrate the housing cover to a much greater degree than it would be necessary to insure a proper seal. This has the disadvantage that unnecessarily large impressions are made into the housing cover It is the object of the present invention to provide a housing cover with a seal structure in such a way that the impressions formed do not need to exceed the depth required for providing a good seal that is that they do not need to accommodate manufacturing tolerances.

SUMMARY OF THE INVENTION

In a housing cover, particularly a valve cover for an internal combustion engine, having a seal surface extending around its circumference at one side thereof with a seal structure molded onto the seal surface, deformable projections are formed on the side opposite the seal surface for engaging the housing cover by a tool when the seal is molded onto the seal surface.

The deformable projections on the opposite side of the seal surface accommodate manufacturing tolerances without affecting the seal surfaces. Depending on the amount of excess thickness of the housing cover the deformable projections are compressed to a greater or smaller degree.

Since the manufacturing tolerances are accommodated by the projections the tool does not need any or any excessively large wedge-like projections. However, wedge-like projections may still be provided on the tool in order to improve the sealing capability. Since the tolerances are accommodated by the projection on the side of the cover opposite the seal surface the housing cover has no deep grooves on the side of the seal but only slight traces of grooves which are generated, if present, by the relatively small wedge-like projections and which increase the sealing capability of the housing cover.

It is particularly advantageous if the deformable projections comprise a plastically deformable material. It was found to be advantageous if the deformable projections are formed integrally with the housing cover. If they are formed integrally, the deformable projections can be molded when the housing cover is molded; they can be included in the mold in which the housing cover is molded. Consequently, no separate manufacturing step is necessary for forming the deformable projections.

Preferably, the deformable projections are semispherical. On one hand, semispherical projections can be formed particularly easily and, on the other hand, have particularly good properties as far as deformability is concerned. However, the projections may have square cross-sections or they may be formed pyramid-like.

Preferably, the deformable projections are evenly distributed over an area, which is covered by the seal. In this way, the force for deforming the projections becomes effective at those areas of the housing cover where the upper part of the tool is placed onto housing cover. With the even distribution of the projection the same deformation force is present everywhere whereby, during the deformation of the projections, the housing cover remains in its proper position relative to the tool base.

Further details and features as well as advantages of the invention will become apparent from the following description of a particular embodiment of the invention on the basis of the accompanying drawings.

DESCRIPTION OF A PREFERRED EMBODIMENT

Figure 1:
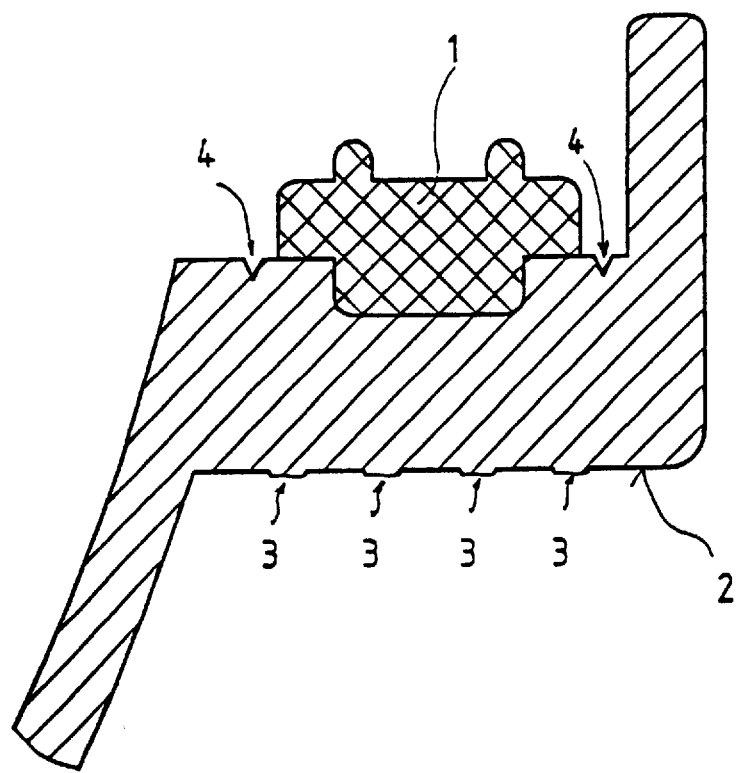
FIG. 1 is a partial sectional view of a housing cover according to the invention with a seal structure formed together therewith.

As shown in FIG. 1, the housing cover is provided with a seal 1 which is attached to one side of the housing cover. On the side 2 of the housing cover opposite the seal 1, there are deformable projections 3 projecting from the surface of the housing cover. The projections 3 are integrally formed with the housing cover. The projections 3 as shown in FIG. 1 are flattened since they were subjected to pressure when the seal 1 was formed onto the housing cover. At opposite sides of the seal 1, the housing cover has grooves 4 formed into its surface during the application of the seal structure.

Figure 2:
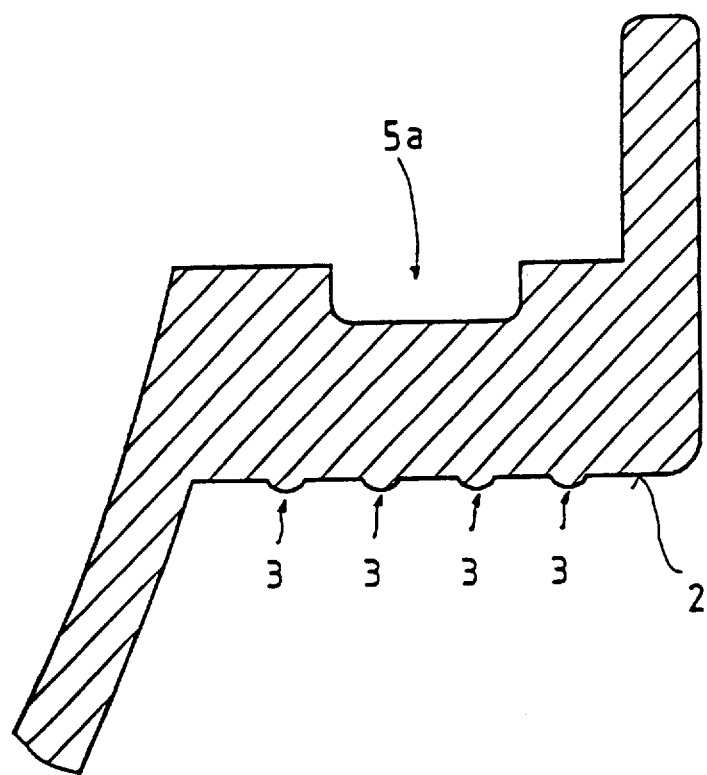
FIG. 2 shows the housing cover before the seal is molded thereon.
Figure 3:
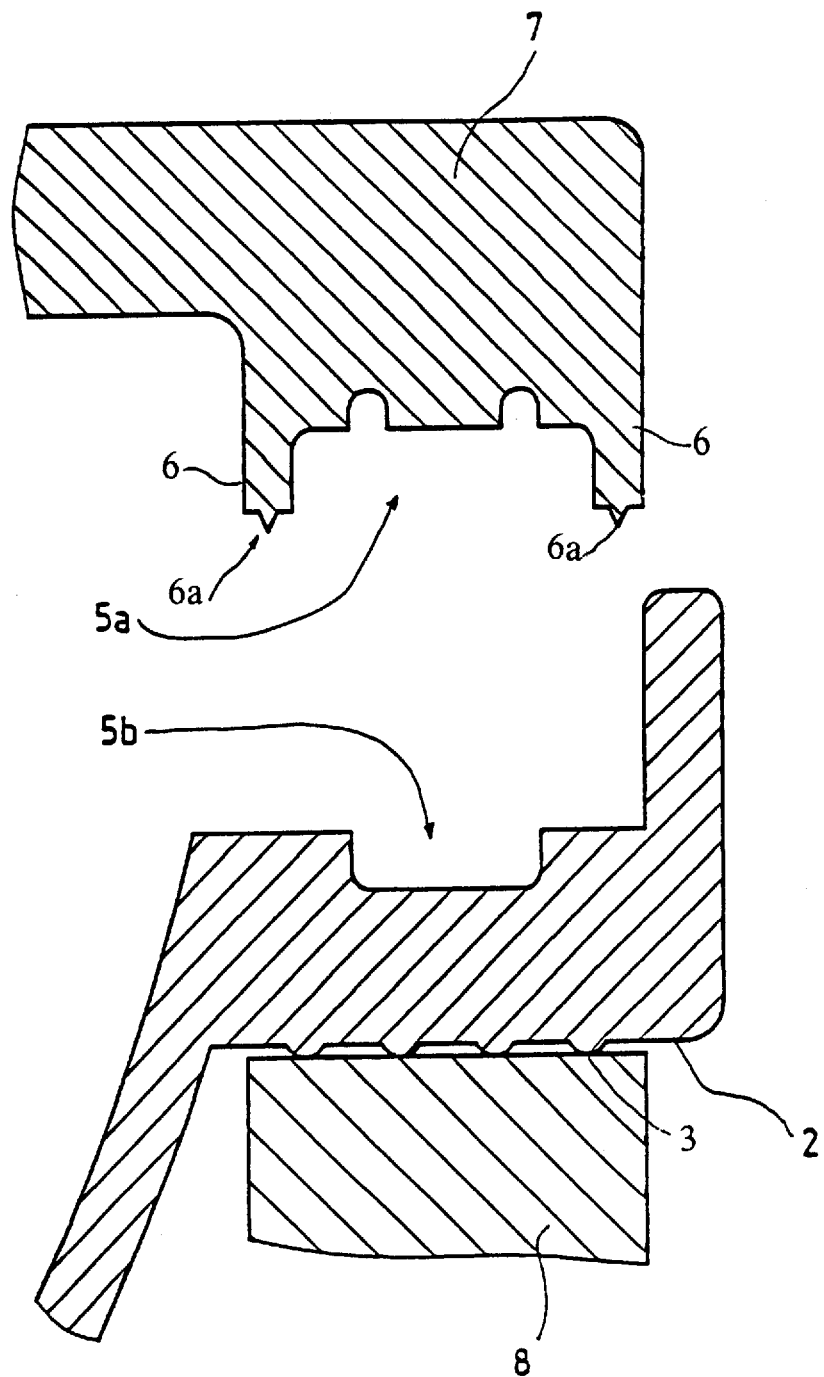
FIG. 3 shows the housing cover of FIG. 2 disposed in a tool.

As shown particularly in FIGS. 2 and 3, the projections 3 have a semispherical shape before the seal structure is formed onto the housing cover. The functioning of the housing cover according to the invention will be described on the basis of FIG. 3. A cover of aluminum is disposed between a tool top part 7 and a tool bottom part 8. The aluminum housing cover includes a recess 5b for receiving the core portion of a seal member 1. The upper tool part 7 has a recess 5a which corresponds to the shape of the seal structure outside of the recess 5b. The recess 5a is delimited by two web-like side walls 6 which have wedge-like projections 6a at their front ends.

The aluminum cover is provided with semispherical projections 3 by which it rests on the lower tool part 8.

For forming the seal structure, the upper tool part 7 is lowered down onto the aluminum housing cover. In this process, the wedge-like projections 6a penetrate into the surface of the cover whereby the space formed by the recesses 5a and 5b is sealed off. Then a liquid seal material is injected into the sealed off space under high pressure. After solidification of the seal material, the tool top part 7 is lifted off the housing cover.

Upon lowering of the tool top part 7 onto the housing cover the housing cover is pressed onto the tool bottom part 8 for engagement therewith. In this process the semispherical projections 3 are deformed.

The deformation occurs until the upper tool part 7 reaches its end position. Depending on the thickness of the housing cover, the housing cover is pressed onto the bottom tool part to a smaller or greater extent whereby the semispherical projections are deformed to smaller or greater degree. Any manufacturing tolerances can therefore be accommodated by way of the deformation of the semispherical projections 3.

Figure 4:
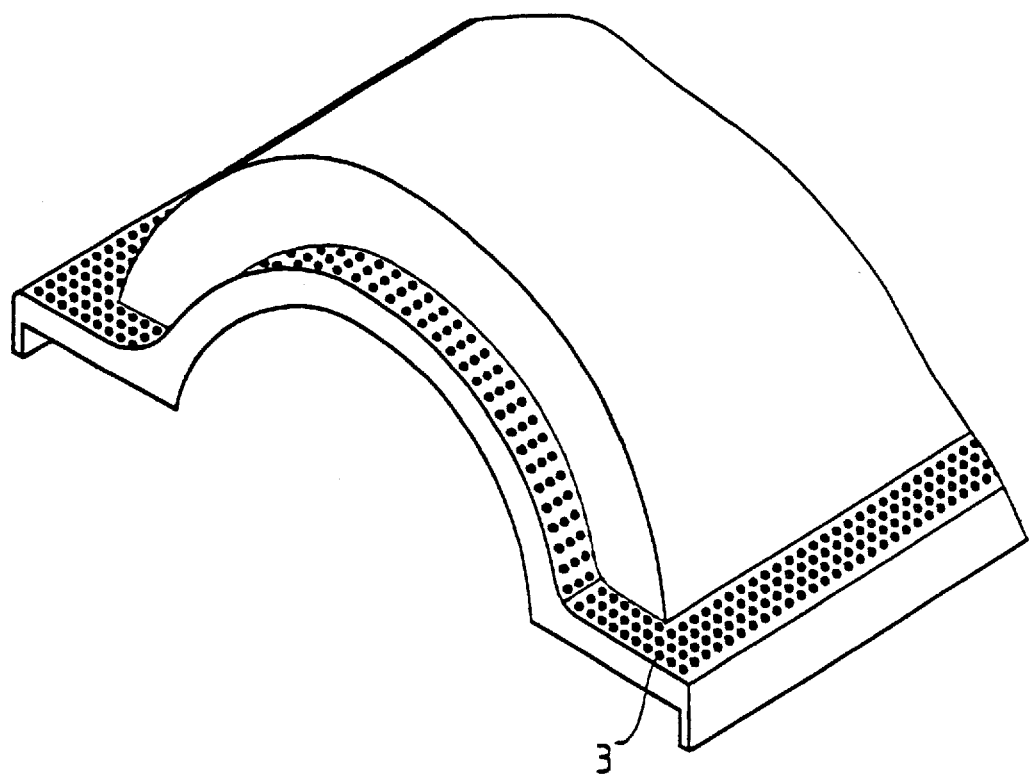
FIG. 4 is a perspective view of the housing cover according to the invention.

As shown in FIG. 4, the semispherical projections 3 are evenly distributed over the area of the housing cover opposite of which the seal structure 1 is disposed.

What is claimed is:

1. A valve housing cover for an internal combustion engine, having a seal surface at one side thereof with a seal molded onto said seal surface and deformable projections formed on the side opposite said seal surface for engaging said housing cover with a tool when said seal is molded onto said seal surface.

2. A housing cover according to claim 1, wherein said projections consist of a plastically deformable material.

3. A housing cover according to claim 1, wherein said projections are integrally formed with said housing cover.

4. A housing cover according to claim 1, wherein said projections have a semi-spherical shape.

5. A housing cover according to claim 1, wherein said projections are evenly distributed on the opposite side of the area covered by said seal.

\* \* \* \* \*